United States Patent [19]

Higashino et al.

[11] Patent Number: 5,212,767
[45] Date of Patent: May 18, 1993

[54] MULTI-LAYER NETWORK AND LEARNING METHOD THEREFOR

[75] Inventors: Junichi Higashino, Kodaira; Hitoshi Matsushima, Tachikawa, both of Japan

[73] Assignee: Hitachi, Ltd., Tokyo, Japan

[21] Appl. No.: 625,166

[22] Filed: Dec. 10, 1990

[30] Foreign Application Priority Data

Dec. 15, 1989 [JP] Japan .................................. 1-323721

[51] Int. Cl.⁵ .......................................... G06F 15/18
[52] U.S. Cl. ........................................ 395/27; 395/11; 395/800
[58] Field of Search ................... 364/513, 807; 382/15; 307/201; 395/24, 26, 27, 800, 11

[56] References Cited

U.S. PATENT DOCUMENTS

| | | | |
|---|---|---|---|
| 4,941,122 | 7/1990 | Weideman | 564/807 |
| 4,947,482 | 8/1990 | Brown | 364/807 |
| 4,974,169 | 11/1990 | Engel | 364/513 |
| 4,994,982 | 2/1991 | Duranton et al. | 364/513 |
| 5,040,230 | 8/1991 | Takatori et al. | 382/15 |
| 5,046,019 | 9/1991 | Basehore | 364/513 |

OTHER PUBLICATIONS

Eberhardt et al., "Design of Parallel Hardware Neural Network Systems from Custom Analog VLSI 'Building Block' Chips", Internat. Joint Conf. on Neural Networks 1989, vol. 2, pp. 183–190, Jun. 18–22, 1989.

Yasunaga et al., "A Water Scale Integration Neural Network Utilizing Completely Digital Circuits", Internat. Joint Conf. on Neural Networks, Jun. 18–22, 1989, vol. 2, pp. 213–217.

Lippmann, "An Introduction to Computing with Neural Nets", IEEE ASSP Magazine, Apr. 1987, pp. 4–22.

Yukimasa Sato, et al., "A Neural Network Accelerator Using General Purpose Floating Point Digital Signal Processors", Technical & Research Report of the Institute of Electronics, Information and Communication Engineers of Japan, ME and Biocybernetics 88–134, 1989, pp. 83–88. (English translation unavailable).

D. E. Rumelhart, et al., Chap. 8 "Learning Internal Representations by Error Propagation", Parallel Distributed Processing: Explorations in the Microstructure of Cognition, vol. 1: Foundations, The MIT Press, Cambridge, Mass. (1986), pp. 318–362. (Provided in English).

Primary Examiner—Allen R. MacDonald
Attorney, Agent, or Firm—Fay, Sharpe, Beall, Fagan, Minnich & McKee

[57] ABSTRACT

A multi-layer neural network comprising an input layer, a hidden layer and an output layer and a learning method for such a network are disclosed. A processor belonging to the hidden layer stores both the factors of multiplication or weights of link for a successive layer nearer to the input layer and the factors of multiplication or weights of link for a preceding layer nearer to the output layer. Namely, the weight for a certain connection is doubly stored in processors which are at opposite ends of that connection. Upon forward calculation, the access to the weights for the successive layer among the weights stored in the processors of the hidden layer can be made by the processors independently from each other. Similarly, upon backward calculation, the access to weights for the preceding layer can be made by the processors independently from each other.

12 Claims, 14 Drawing Sheets

MULTI-LAYER NETWORK AND LEARNING METHOD THEREFOR

This application is cross-referenced to co-pending U.S. application Ser. No. 07/602,611, inventors M. Asai, [et al.] *M. Yasunaga, M. Yagu, M. Yamada, and K. Shibata,* entitled "Information Processing Apparatus", and filed Oct. 1990 and based on Japanese Patent Application No. 1-275835 filed on Oct. 25, 1991, the contents of which are incorporated herein by reference.

BACKGROUND OF THE INVENTION

The present invention realtes to a system for rapidly performing the learning of a multi-layer neural network which is capable of being applied to image pattern recognition such as character recognition, signal processing in a sonar, and stock or financial business, and a parallel calculation method or learning method for such a multi-layer neural network.

If the learning of a multi-layer neural network is performed on a general purpose computer which is composed of a single processor, calculation over a long time is required since a great number of times of calculation are generally involved. To begin with, the neural network is easy to implement on a parallel computer and the improvement in speed of parallel processing can be expected by a proper learning method.

Accordingly, approaches for performing high-speed calculation by parallel processing have been made and one of them is disclosed by Technical & Research Report of the Institute of Electronics, Information and Communication Engineers of Japan, ME and Biocybernetics 88-134 (1989). In the disclosed approach, a plurality of processors are arranged in a ring form. The processor includes a digital signal processor (DSP) and a local memory. One processor is allotted with one node or more of a layer adjacent to that processor. In a local memory of a processor allotted with a certain node are stored the factors of multiplication (or weights) for a preceding layer to which that node belongs. When the calculation of sum of products is performed forward from an input or initial layer toward an output or final layer, each of processors belonging to a certain layer independently operates to place a product of the value of a node allotted to that processor and a weight for a preceding layer on the ring and the product is rotated on the ring until a desired processor is reached. In this case, a layer near to the input layer becomes a successive layer and a layer near to the output layer becomes a preceding layer. On the other hand, when the calculation of sum of products is performed backward from the output layer toward the input layer, it is not required to place any weight on the ring since no weight necessary for performing the calculation of sum of products is stored in each processor. But, it is necessary to transmit error data from the output layer to a successive layer. Therefore, the error data is rotated on the ring until a desired processor is reached. Namely, in order to transfer data to a node which is at a distance of N nodes, it is required that the data is rotated N times on the ring. Accordingly, if the number of processors involved increases, a time required for data transfer is increased. In order to eliminate an overhead associated with the data transfer, it is effective to change the connection configuration of processors from the ring form to a bus form. In the bus type connection, data can be transferred with the same time lag to a node which is at any distance. The bus type connection is described in detail by JP-A-2-181257 (corresponding to U.S. Ser. No. 07/461,080 filed Jan. 4, 1990 assigned to the same assignee of the present application).

In the bus type connection, data place on a bus from a certain processor can be received by a plurality of processors simultaneously and hence the calculation of sum of products can be performed in parallel. Now assume that there is employed a structure in which each processor holds weights for a successive layer. In this case, when the calculation of sum of products is performed in a forward direction, processors of a successive layer successively place their outputs on the bus and processors of a preceding layer can calculate the sum of products from weights corresponding to respective connections. On the other hand, when the calculation of sum of products is executed in a backward direction, weights necessary for performing the calculation of sum of products must be transferred from a preceding layer to a successive layer since such weights are not stored in processors of the preceding layer which perform the calculation of sum of products. However, since the preceding layer and the successive layer are connected by the bus, it is not possible to transfer data in parallel. Therefore, there is a demerit that the improvement in execution speed proportional to the number of processors cannot be expected.

In the above-mentioned prior art, the reduction of the amount of data to be processed upon transfer of data between processors is not taken into consideration and hence there is a problem that a high speed cannot be achieved even if a plurality of processors are connected.

SUMMARY OF THE INVENTION

An object of the present invention is to eliminate data transfer, thereby improving the execution speed of parallel processing.

To that end, in a multi-layer network of the present invention, a processor belonging to a hidden layer stores the factors of multiplication or weights of link for a preceding layer nearer to an output layer as well as the factors of multiplication or weights of link for a successive layer nearer to an input layer. Namely, the weight for a certain connection is doubly stored in processors which are at opposite ends of that connection.

Since the learning of the multi-layer network is to adjust the values of the above-mentioned weights, it is necessary that the doubly stored weights take the same value always. Therefore, necessary data are transferred between processors which are at the opposite ends of a certain connection.

In the case where it is not possible to store the weights for the preceding layer and the weights for the successive layer in one processor, the weights for the successive layer are divisionally stored in different processors, the weights for the preceding layer are divisionally stored in different processors, or the weights for the successive layer and the weights for the preceding layer are divisionally stored in different processors.

Upon forward calculation, the access to the weights for the successive layer among the weights stored in the processors of the hidden layer can be made by the processors independently from each other. Similarly, upon backward calculation, the access to the weights for the preceding layer can be made by the processors independently from each other.

The doubly stored weights are adjusted by different processors so that they have the same value. Therefore, the result of execution on a single-processor compute and the result of the learning of the multi-layer network according to the present invention are equal to each other.

Other objects and features of the present invention will become apparent from the following detailed description made in conjunction with the appended claims.

DESCRIPTION OF THE PREFERRED EMBODIMENTS

Embodiments of the present invention will now be explained by virtue of the accompanying drawings.

By use of FIG. 2, explanation will be made of the principle of the operation of a system having a structure in which a multiplicity of processors are interconnected. Such system is hereinafter referred to as a a network. The term "processor" means a processing device which includes an arithmetic unit, a storage unit and/or the like. Units constructing the network are called nodes and a path between nodes is called a link. A certain value corresponding to the link is called a weight. A processing required by a node is performed by a processor. There can be employed a construction in which the processing for one node is performed by one processor, a structure in which the processing for a plurality of nodes is performed by one processors or a structure in which the processing for one node is performed by a plurality of processors. Accordingly, the link between nodes may be the connection between processors or the data transfer in a processor. In the following, the connection between nodes is termed link and the connection between processors is termed connection.

Figure 2:
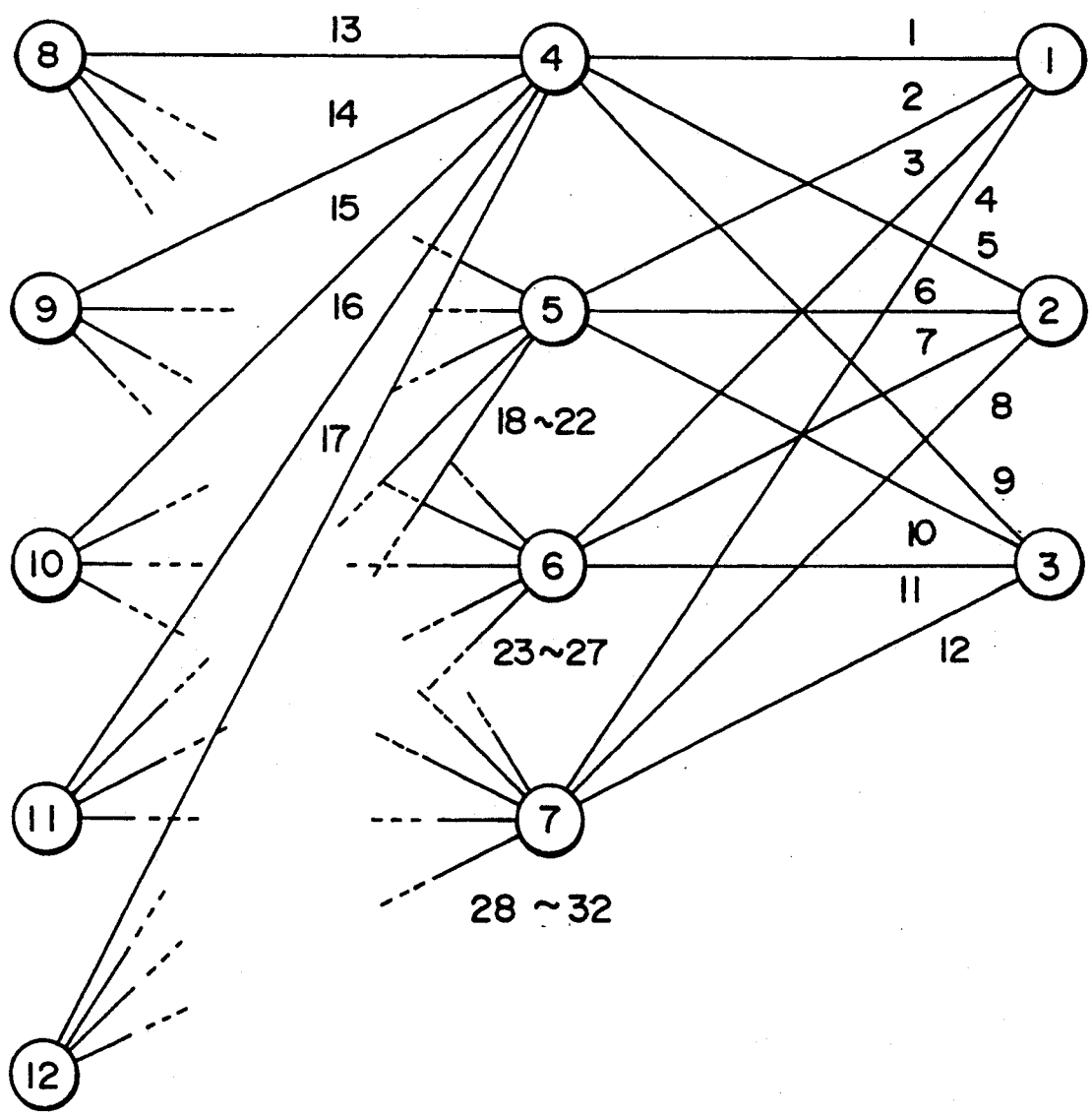
FIG. 2 is a diagram for explaining the concept of a multi-layer network.

In FIG. 2, processors are arranged in three layers and are connected only between the layers. The most left layer or input layer is composed of processors 8 to 12. A middle layer or hidden layer is composed of processors 4 to 7. The most right layer or output layer is composed of processors 1 to 3. There are inter-layer links or a link from the input layer to the hidden layer and a link from the hidden layer to the output layer.

In FIG. 2, the processor 1 in the output layer is connected with the processors 4 to 7 in the hidden layer through connections 1 to 4. Direct transfer of data is possible only between processors which are at opposite ends of such a connection. In the shown example, a processor in each layer is connected with all of processors in a layer adjacent to that layer. However, a processor in each layer may be connected with not all of processors in a layer adjacent to that layer but a part thereof. Also, though the connection between processors is made only between adjacent layers, it may be made between layers which are not adjacent to each other. Connections 1 to 32 in FIG. 2 operate as weights when data is transferred. For example, an input of the processor 4 is the sum of products of outputs of the processors 8 to 12 in the preceding stage and the weights of link for connections corresponding to the processors 8 to 12. Namely, provided that the output of a processor i is $o_i$ the input thereof is $u_i$ and the weight of link for connection k between processors i and j is $W_k$, the input $u_4$ of the processor 4 as an example is $$u_4 = W_{13}.o_8 + W_{14}.o_9 + W_{15}.o_{10} + W_{16}.o_{11} + W_{17}.o_{12}.$$

The input $u_i$ is converted into $o_i$ by the processing in the processor i and is transmitted as the output of the processor i to processors connected directly.

The above calculation of sum of products is performed by each of the processors 4 to 7. At this time, the processors 8 to 12 in the preceding stage are supplying their output values. Similarly, the processors 4 to 7 supply their output values and the each of processors 1 to 3 performs the calculation of sum of products. In this manner, the values outputted from the processors 8 to 12 forming the input layer are subjected to the calculation of sum of products in twice and are thereby converted into the outputs of the processors 1 to 3 which form the output layer. Particularly, pattern data of the input layer may represent an image and output data of the output layer may represent the classification of that image. For example, in the case where an input image is a character, the system can be utilized as a character recognition system. The input may be a voice pattern or time-serial data such as economical data. In any case, a given input can be outputted as more intelligible pattern data through a proper conversion processing. It is not required that the processor of the input layer is a processor which processes data. The processor of the input layer may be a memory which holds data. Further, it is not required that the hidden layer is one in number. The above concept can be extended to the case where a plurality of hidden layers are involved.

Usually, there may be many set of input and output patterns. Therefore, the weights of link must be adjusted so that the optimum output is obtained for any input. The calculation for that purpose is called the learning of a network. One of the learning methods is a method called back propagation which is proposed by Rumelhart, D. E., Hinton, G. E. and Williams, R. J.: Parallel Distributed Processing: Explorations in the Microstructure of Cognition. Volume 1: Foundations, Chapter 8, The MIT Press, Cambridge, Mass. (1986). It is shown that the back propagation learning method can be applied also to a problem which cannot be solved by the conventional learning method called perceptron.

Next, the outline of the back propagation learning method will be explained. Since the purpose of the learning is to adjust the weight of link for each connection, the learning is started with random values being taken as the initial values of weights. Immediately after the start, a desired output pattern cannot be obtained since the weights are not adjusted. Therefore, the weight of link for each connection is corrected on the basis of a difference between the obtained output value and a desired output value. The desired output value is known and is called a supervised value. The weight of link for a connection with a processor of an output layer can be determined from an output value of a hidden layer, an output value at the output layer and a supervised value by the equation $$\Delta W_{ji}(n+1) = \eta \delta_j o_j + \alpha \Delta W_{ji}(n) \quad \delta_j = o_j(1-o_j)(t_j-o_j)$$

in which a non-linear saturated function called a sigmoid function is used for the input-to-output convertion in a processor, $W_{ji}$ represents the value of weight of a link from a node i of the hidden layer to a node i of the output layer, $o_i$ represents an output value from the node i and $t_j$ represents a supervised value, $\eta$ and $\alpha$ are coefficients having certain values and are set so as to advance the leaning with a good efficiency, $\alpha$ is the preceding corrected value and are useful for the stabilization and the improvement in speed of the learning, n represents the number of times of repetition of the learning and once is counted with a weight being corrected on the basis of output value obtained by the provision of a pattern to the input layer and the supervised value, and $\delta_j$ represents a difference which is determined from a product of the derivative of the sigmoid function and an error. Since a small updating value for the weight of link for each connection is determined at every time from the above equation, the weight value $$W_{ji}(n+1) = \Delta W_{ji}(n+1) + W_{ji}(n)$$

is used for the next time.

In the example shown in FIG. 2, when the term of the coefficient $\alpha$ is omitted, the weights at the output layer can be corrected by a series of calculations $$\Delta W_1 = \eta \cdot o_1 \cdot (1-o_1) \cdot (t_1-o_1) \cdot u_4$$

$$\Delta W_2 = \eta \cdot o_1 \cdot (1-o_1) \cdot (t_1-o_1) \cdot u_5$$

$$\Delta W_3 = \eta \cdot o_1 \cdot (1-o_1) \cdot (t_1-o_1) \cdot u_6$$

$$\Delta W_4 = \eta \cdot o_1 \cdot (1-o_1) \cdot (t_1-o_1) \cdot u_7$$

$$\Delta W_{12} = \eta \cdot o_3 \cdot (1-o_3) \cdot (t_3-o_3) \cdot u_7$$

Here, $t_j$ represents a supervised value when a certain pattern p is given to the node j of the output layer. For simplification, a suffix p is omitted.

Next, a method of correcting the weights of link between the input layer and the hidden layer will be explained. In the output layer, the differences can be determined since the output values at the output layer can be directly compared with the supervised values. In the hidden layer, however, a value which is to be outputted by a node of the hidden layer is unknown. Accordingly, a generalized delta or difference is determined from the calculation of sum of products of the differences at the output layer and the weights of link between the hidden layer and the output layer by the equation $$\delta_j = o_j(1-o_j) \Sigma_k \delta_k W_{kj}$$

where $\delta_k$ represents the difference at the output layer and $W_{kj}$ the weight of link between a node i of the hidden layer and a node k of the output layer. This difference $\delta_j$ can be regarded as being the generalized delta or difference. Namely, the difference at the output layer is a difference between the actual output value at the output layer and the supervised value and the difference at the hidden layer is the value of the sum of products of the differences at the output layer and the weights of link between the hidden layer and the output layer. The difference at the output layer is propagated toward the input layer in a direction reverse to a direction in which data is propagated from the input toward the output. Here, it should be noted that the weights necessary for the calculation of the generalized difference at the node j correspond to connections outgoing from the node j.

In the example shown in FIG. 2, the following calculation is made. The generalized differences $\delta_4$ to $\delta_7$ at the hidden layer are determined by use of the differences $\delta_1$ to $\delta_3$ at the output layer, as follows:

$$\delta_4 = o_4 \cdot (1-o_4)(\delta_1 \cdot W_1 + \delta_2 \cdot W_5 + \delta_3 \cdot W_9)$$

$$\delta_5 = o_5 \cdot (1-o_5)(\delta_1 \cdot W_2 + \delta_2 \cdot W_6 + \delta_3 \cdot W_{10})$$

$$\delta_6 = o_6 \cdot (1-o_6)(\delta_1 \cdot W_3 + \delta_2 \cdot W_7 + \delta_3 \cdot W_{11})$$

$$\delta_7 = o_7 \cdot (1-o_7)(\delta_1 \cdot W_4 + \delta_2 \cdot W_8 + \delta_3 \cdot W_{12})$$

The weights are corrected as follows:

$$\delta W_{13} = \eta \cdot \delta_4 \cdot o_8$$

$$\delta W_{17} = \eta \cdot \delta_4 \cdot o_{12}$$

$$\delta W_{32} = \eta \cdot \delta_7 \cdot o_{12}$$

In the above calculation method, the derivative of the sigmoid function has been used in determining the generalized difference and $\eta \delta_j o_j$ has been used in making the correction for weight. However, even if a general method including the above method, that is, $$\Delta W_{ji} = g(W_{ji}, X_i, Y_j)$$

is used, embodiments mentioned hereinafter are effective. Namely, the correction for weight is applicable to the case where the calculation is made directly from the states of opposite ends of any connection. The above-mentioned method corresponds to the case where $X_i=o_i$ and $Y_j=\delta_j$. The foregoing explanation has been made in conjunction which the hidden layer is one in number. However, the generalized difference can be similarly determined even in the case where there are a plurality of hidden layers.

As far as here, the node and the connection have been simply explained as mathematical components. Actually, however, they are provided with physical components. The node may be realized using an element on a processor, for example, a process or a task or may be a variable in a program In this case, the access to the weights of link for all of connections can be made from a single processor. However, in the case where the network is constructed using a plurality of processors, storage locations of the weights of link for connections become a technical problem. Namely, if all of weights are stored in the same memory, accesses from the plurality of processors conflict with each other, thereby making it difficult to realize the improvement in performance proportional to the number of processors. Accordingly, there is employed a method in which the weights of link are stored in memories provided for individual processors.

Figure 1A:
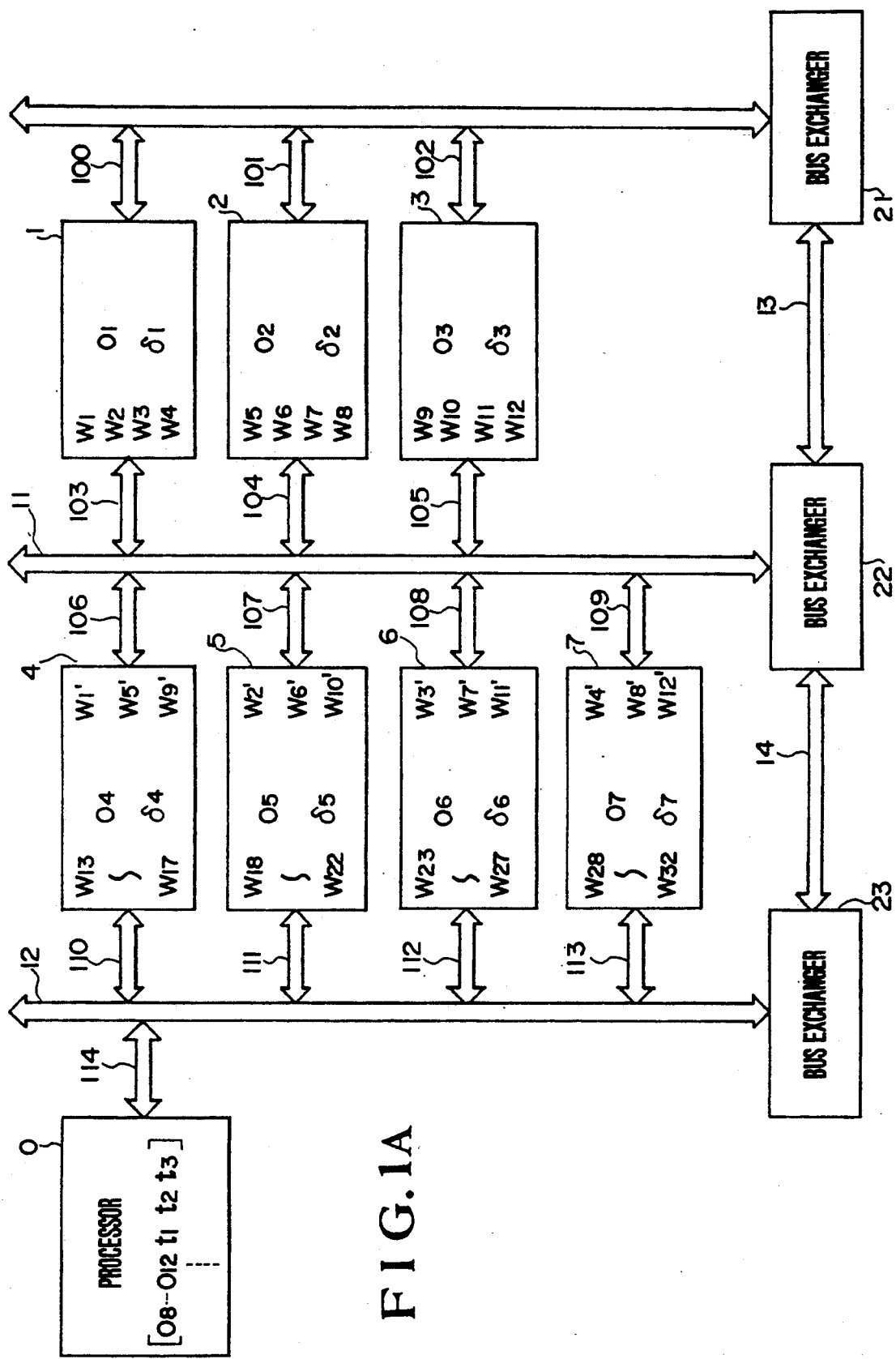
FIG. 1A is a block diagram of a multi-layer network according to an embodiment of the present invention.

FIG. 1A shows an example in which one node is assigned to one processor and explanation will be made of a method characteristic of the present invention in which the same weight is stored at a plurality of different locations. The network shown in FIG. 1A includes processors 0 to 7 the number of which is eight in total. The processors 1 to 7 shown in FIG. 1A correspond to the processors 1 to 7 shown in FIG. 2. The processor 0 in FIG. 1A corresponds to the processors 8 to 12 in FIG. 2. The input layer merely holds output values, as mentioned before. In FIG. 1A, therefore, the input layer is composed of one processor.

In FIG. 2, the links between nodes are realized by the connections between processors which belong to those nodes and hence the number of connections increases at the rate of the second power with respect to the increase in number of processors. In FIG. 1A, on the other hand, the layers are connected or linked by buses 10, 11 and 12. The buses 10 to 12 and the processors are connected by buses 100 to 114. The buses 10, 11 and 12 are interconnected by buses 13 and 14 through bus exchangers 21, 22 and 23. Accordingly, for example, when a supervised value is to be supplied from the processor 0 to the processors 1, 2 and 3, the buses 100, 101 and 102 are used through the bus 12, the bus exchanger 23, the bus 14, the bus exchanger 22, the bus 13, the bus exchanger 21 and the bus 10. The processor 0 operates not only to supply an input and a supervised pattern but also to control the whole of the network. In the case where two hidden layers or more are involved, control data is transferred through a bus such as the bus 11 to which the processors of the hidden layers are connected.

The calculation at each layer is as follows. Processors of different layers has no 1 to 1 direct connection therebetween. For example, the processor 4 of the preceding layer delivers an output $o_4$ through the bus 106 to the bus 11 to which the processors in the succeeding stage are connected. In this case, since the processors in the two layers are not connected independently but connected by the bus, the processors 5 to 7 are in idle conditions. However, even if the processor 5 provides an output simultaneously with the output of the processor 4, there results in a wait for calculation if the calculations of sum of products cannot be made simultaneously at the processors in the succeeding stage which receive the output of the processor 5. Therefore, even if any outputs are simultaneously delivered from separated buses, there is no effect of the simultaneous output. However on the other hand, the calculations of sum of products proceed simultaneously at the processors. Therefore, the improvement in speed proportional to the number of processors included in the layers can be expected.

It is not required that the buses 10, 11 and 12 are buses independent from each other. Namely, there may be employed a structure in which all of processors are connected to a single bus. However, in the case where separated buses are used as in FIG. 1A, simultaneous localized transfer of data is possible. Therefore, it becomes possible to perform the calculations of sum of products in parallel or to perform the calculation for each layer in a pipeline fashion. As a result, the performance of the whole of the system is improved.

Next, explanation will be made of a weight storing method. Now, consider the weights of link between the hidden layer and the output layer in FIG. 2. For example, the processor 1 is connected with the processors 4 to 7 and the weights of link for the respective connections are the weights 1 to 4 of link. If these weights are stored in a memory of the processor 1 the access to weights necessary for the calculation of sum of products at the processor 1 of the output layer is possible in the same processor 1 in the case where the calculation is made forward from the input layer to the output layer. However, in the case where a generalized difference is propagated backward from the output layer toward the input layer, a processor of the hidden layer, for example, the processor 4 requires the access to the weights 1, 5 and 9 of link. Since those weights are not present in the processor 4, it is necessary to transfer data from the processors 1, 2 and 3 of the output layers in which the weights 1, 5 and 9 are present. The above means that the calculations of sum of products at the individual processors can be simultaneously performed upon formed calculation but cannot be simultaneously performed upon backward calculation.

The above problem can be solved by employing a method in which the same weight is stored at a plurality of different locations. In FIG. 1A, the processor 1 of the output layer stores the weights $W_1$, $W_2$, $W_3$ and $W_4$ and also stores an output $o_1$ and a difference $\delta_1$.. The storage at the different locations means, for example, that a storage area having the same value as $W_1$ stored in the processor 1 is also allotted to the processor 4 of the hidden layer (as a storage area $W_1'$). Such a weight is hereinafter referred to as a mirror weight. The processor 4 of the hidden layer further stores therein the some contents $W_5'$ and $W_9'$ as the weights $W_5$ and $W_9$ which are stored in the processors 2 and 3 of the output layer or preceding layer. Such double storage of weight is made to only the processors which belong to the hidden layer and is not necessary to the processors of the output layer. In FIG. 1A, since only one hidden layer is involved, the mirror weights are present in the processors 4 to 7 of the hidden layer. In the case where a plurality of hidden layers are involved the number of processors having mirror weights increases. In general, the mirror weights become necessary in the case where there are layers which are adjacent to each other before and behind.

Figure 1B:
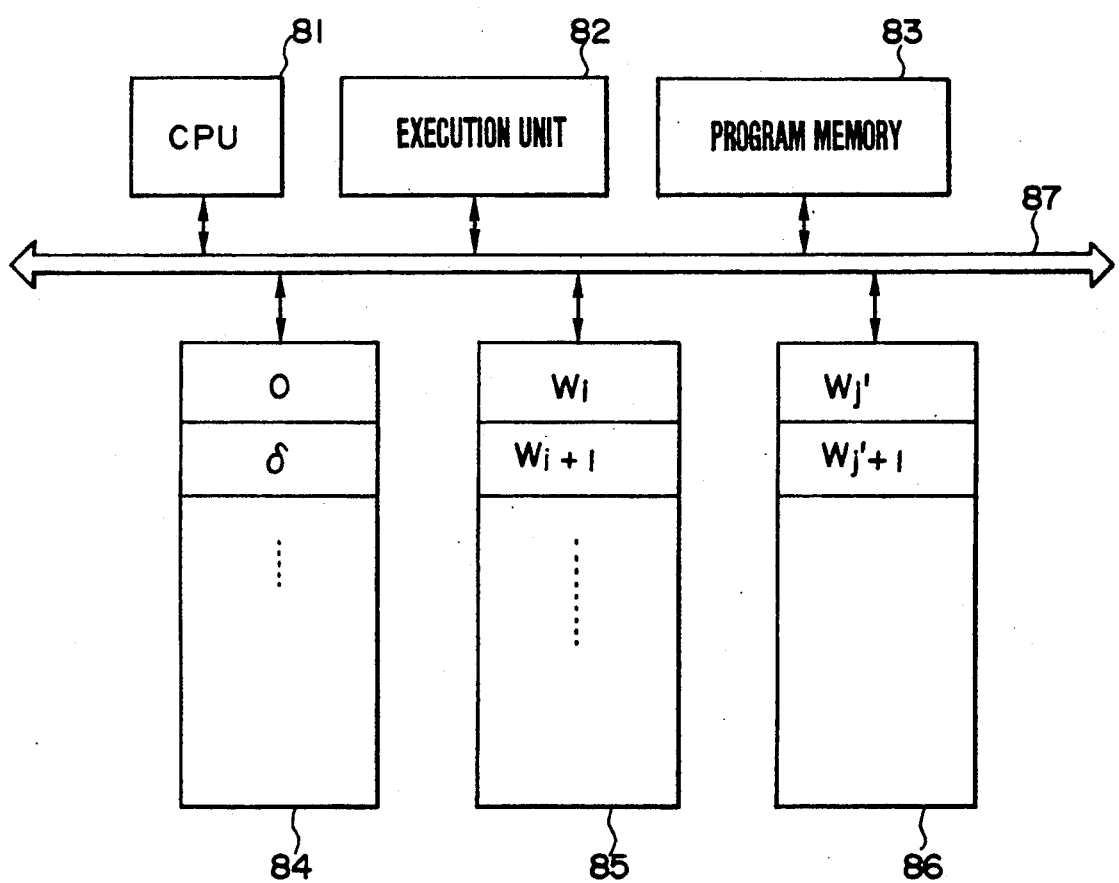
FIG. 1B shows an example of the internal construction of a processor of a hidden layer.

FIG. 1B shows an example of the internal construction of a processor of the hidden layer. In the processor, a CPU 81, an execution unit 82, a program memory 83, an internal state memory 84 for storing internal states such as an output o and a difference $\delta$, a weight memory 85 for storing the weights $W_i$, $W_{i+1}$ ... for a successive layer and a mirror weight memory 86 for storing the mirror weights $W_j'$, $W_{j+1}'$, for a preceding layer are connected to an internal bus 87.

It can be understood that the access from processors is localized because of the provision of mirror weights (dispersed storage), thereby holding the parallel access performance. However, if it is not possible for individual processors to independently correct mirror weights, the parallel calculation performance cannot be maintained. Next, explanation will be made of a parallel learning method in which the identity of the results of correction is ensured even in the case a weight and its mirror weight are present in storage areas of different processors, respectively.

Figure 3:
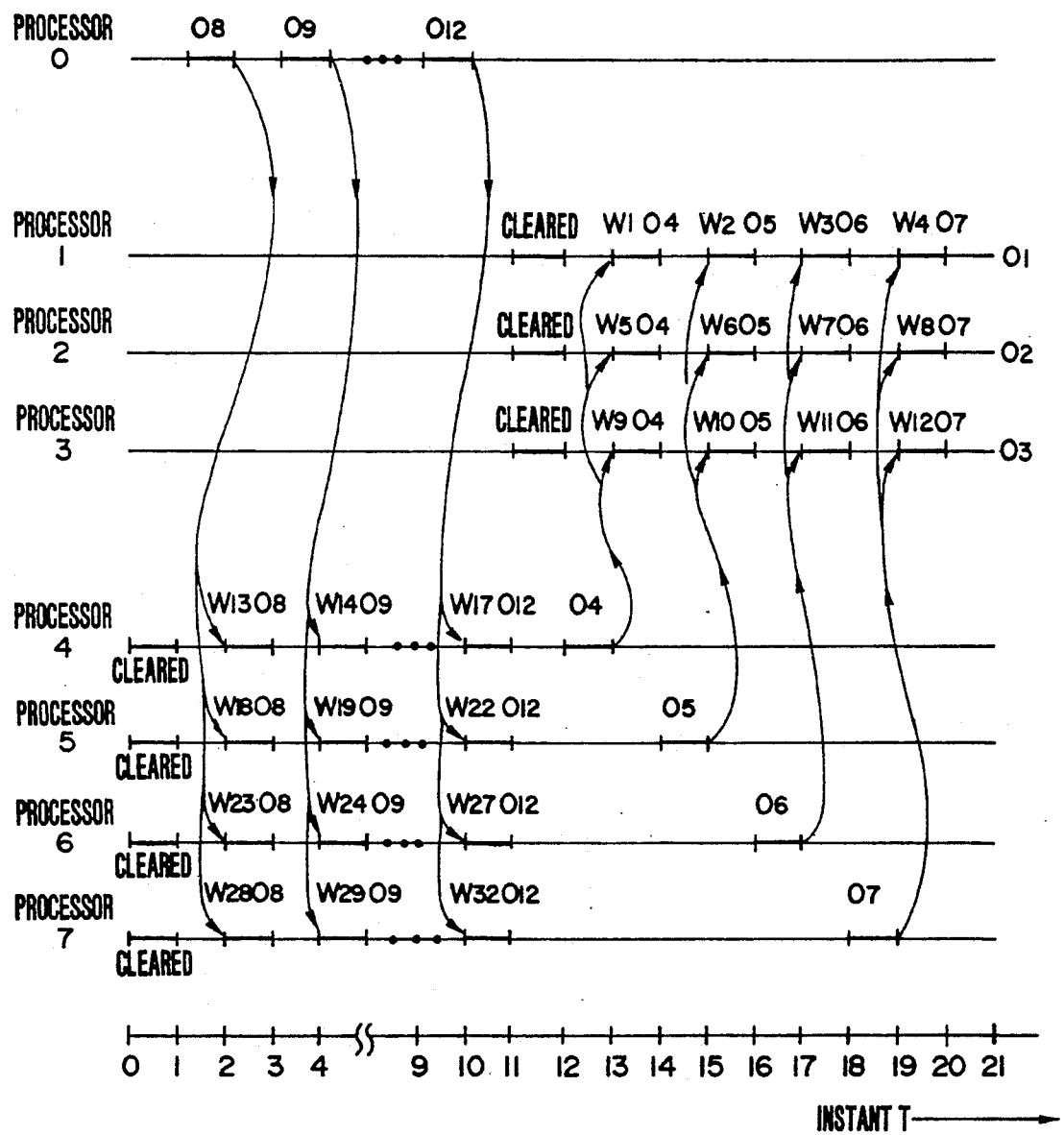
FIG. 3 is a diagram showing the flow of a processing upon forward calculation in the network shown in FIG. 1A.

Firstly, FIG. 3 will be used to explain how the forward calculation in the network having the construction shown in FIG. 1A makes progress through allotment to the multiplicity of processors. The abscissa in FIG. 3 represents an instant of time. For simplification, a time required for transferring data to another processor through a bus is taken as one unit time. A time required for the processing in a processor, for example, the initialization of the state or the calculation of sum of products is also taken as one unit time. FIG. 3 illustrates the conditions of processing at the control processor 0, the conditions of processing at the processors 1 to 7 and the conditions of data transfer between the processors. At instant 0 of time, the storage areas of the processors 4 to 7 used for determining the sum of products are initialized (or cleared out). Next, at instant 1, the processor 0 places an input value $o_8$ on the bus 12 through the bus 114. At instant 2, the processors 4 to 7 receive the input value $o_8$ from the bus 12 and make the products of $o_8$ and weights $W_{23}$ and $W_{28}$ stored in the respective processors, and those products are additively stored into the storage areas which were cleared out at instant 0. At instant 3, the processor 0 broadcasts again an input value $o_9$ to the bus as at instant 1. In this manner, the transfer of data from the processor 0 and the calculation of sum of products at the processors 4 to 7 are alternately performed and the calculation of sum of products at the hidden layer is completed at instant 11. Next, the transfer of data from the hidden layer to the output layer and the calculation of sum of products at the output layer are similarly started from instant 11 and an output from the output layer, that is, outputs $o_1$ to $o_3$ of the network are obtained at instant 20.

Figure 4:
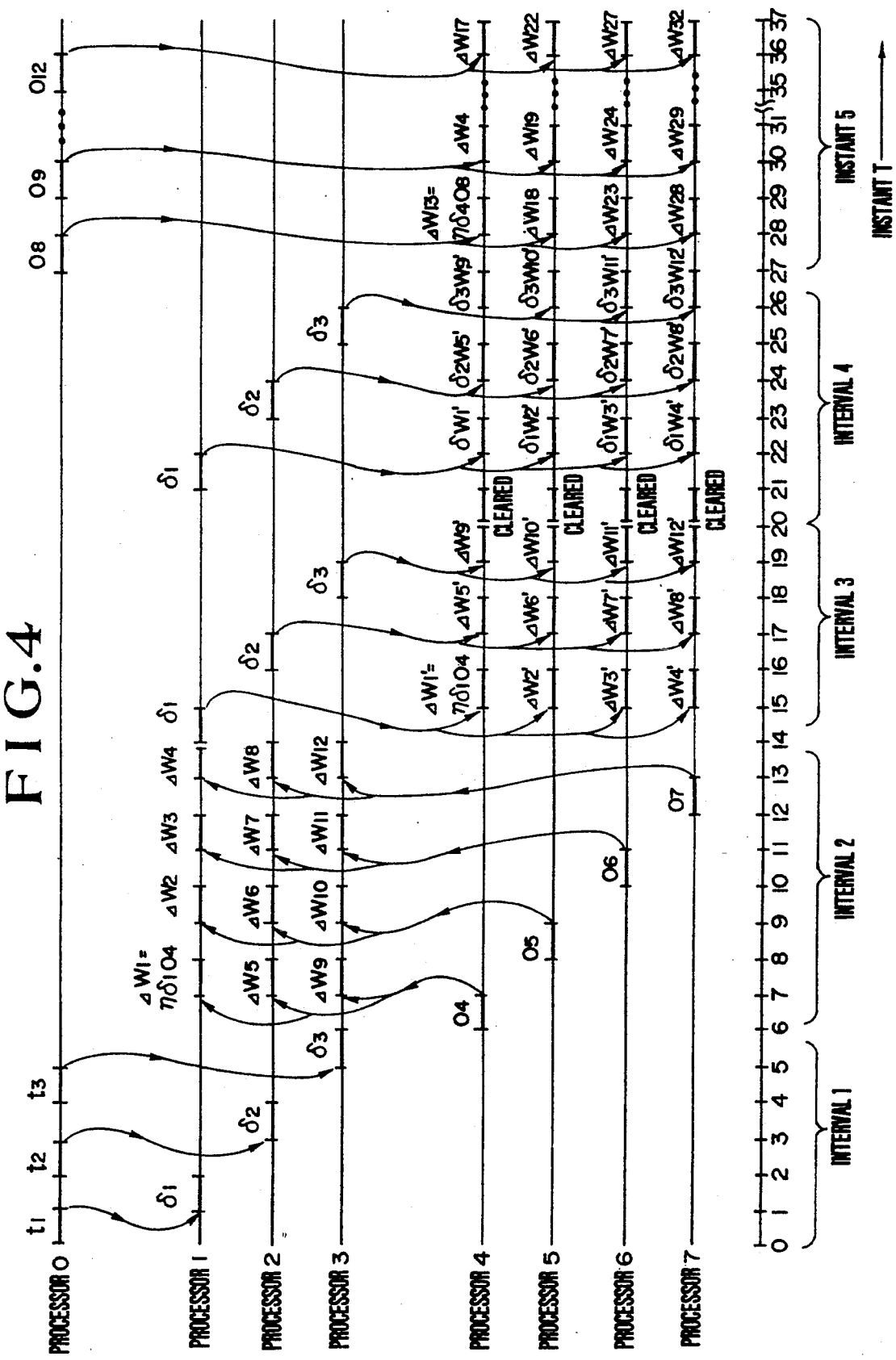
FIG. 4 is a diagram showing the flow of a processing upon backward calculation in the network shown in FIG. 1A.

FIG. 4 is a diagram illustrating the flow of a processing in the backward calculation for weight correction. Using this figure, a method of correction for mirror weight will be explained together with the effect of parallel execution. At instant 0 of time, $t_1$ being a part of a supervised pattern corresponding to an input pattern used in the immediately preceding forward calculation is transferred from the processor 0 to the processor 1 through the buses. At instant 1, the processor 1 determines a difference $\delta_1$ from the output value $o_1$ held in the forward calculation and $t_1$ transferred from the processor 0. At instants 2, 3, 4 and 5, the transfer of parts $t_2$ and $t_3$ of the supervised pattern and the determination of differences $\delta_2$ and $\delta_3$ concerning $t_2$ and $t_3$ are made as at instants 0 and 1. Next, at instants 6 to 14, the weights ($W_1$ to $W_{12}$) in the processors 1 to 3 are corrected. Firstly, in order to correct weights for connections with the processor 4, the processor 4 places $o_4$ on the bus 11 through 106 at instant 6 and the processors 1, 2 and 3 independently take in the data $o_4$ from the bus 11 at instant 7 to determine $\Delta W_1$, $\Delta W_5$ and $\Delta W_9$ from the differences $\delta_1$, $\delta_2$ and $\delta_3$ which have been determined at instants 2, 4 and 6, thereby correcting the weights. At instants 8 and 9, instants 10 and 11 and instants 12 and 13, weights for connections with the processors 5, 6 and 7 are similarly corrected.

Next, mirror weights are corrected at instants 14 to 20. In this case, the differences $\delta_1$, $\delta_2$ and $\delta_3$ held by the processors 1 to 3 of the output layer are successively placed on the bus 11 through the buses 103 to 105 to determine updating values of weights from the output values $o_4$ to $o_7$ held by the processors 4 to 7 of the hidden layer, as shown in FIG. 4. At instants 20 to 27, the differences $\delta_1$, $\delta_2$ and $\delta_3$ held by the output layer are transmitted to the hidden layer and generalized differences at the hidden layer are determined as the results of the calculation of sum of products. Firstly, at instant 20, storage areas of the processors 4 to 7 for determining the sum of products for the differences are initialized (or cleared out). At instant 21, the processor 1 of the output layer places the difference $\delta_1$ on the bus 11. In the processors 4 to 7 of the hidden layer, the products of the difference $\delta_1$ taken from the bus 11 and the mirror weights $W_1'$ to $W_4'$ held by the respective processors are additively stored into the storage areas for the sum of products. The similar processing is performed and the calculation for determination of the generalized differences $\delta_4$, $\delta_5$, $\delta_6$, and $\delta_7$, at the hidden layer is completed at instant 27. Subsequently, weights $W_{13}$ to $W_{32}$ of link between the input layer and the hidden layer are corrected by successively broadcasting corresponding input patterns from the processor 0 again. From the above processing performed by the processors with the lapse of time, it can be understood that processors in each layer operate simultaneously. Further, it is ensured that mirror weights have the same values as weights stored in the preceding layer ($W_i = W_i'$).

The value of a weight should be initialized prior to the start of the learning calculation. Usually, it is initialized to a random value. Generally, pseudo random numbers generated by a computer are used as the random values. Therefore, even if weights are stored in memories of different processors, it is easy to independently set them to the same initial value.

In FIG. 4, there are generally included five intervals, that is, an interval 1 (from instant 0 to instant 6) when the differences at the output layer are determined, an interval 2 (from instant 6 to instant 14) when the weights at the output layer are corrected, an interval 3 (from instant 14 to instant 20) when the mirror weights at the hidden layer are corrected, an interval 4 (from instant 20 to instant 27) when the generalized differences at the hidden layer are determined and an interval 5 (from instant 27 to instant 37) when the weights of link between the input layer and the hidden layer are corrected. These intervals include intervals which may be interchanged in sequence and intervals which may cross each other. For example, the intervals 2 and 3 may be interchanged with the same result. Also, the intervals 1 and 2 may cross each other so that the weight is corrected immediately after the difference δ has been determined. In the intervals 3 and 4, the differences at the output layer are similar broadcast. However, if the hidden layer is provided with areas which can hold data, one time of broadcast suffices, thereby making the improvement in speed possible. Thus, if surplus storage areas are present, the overall time can be shortened by interchanging the intervals and/or making the intervals cross each other. In either case, there is the effect of introduction of mirror weights.

Figure 5:
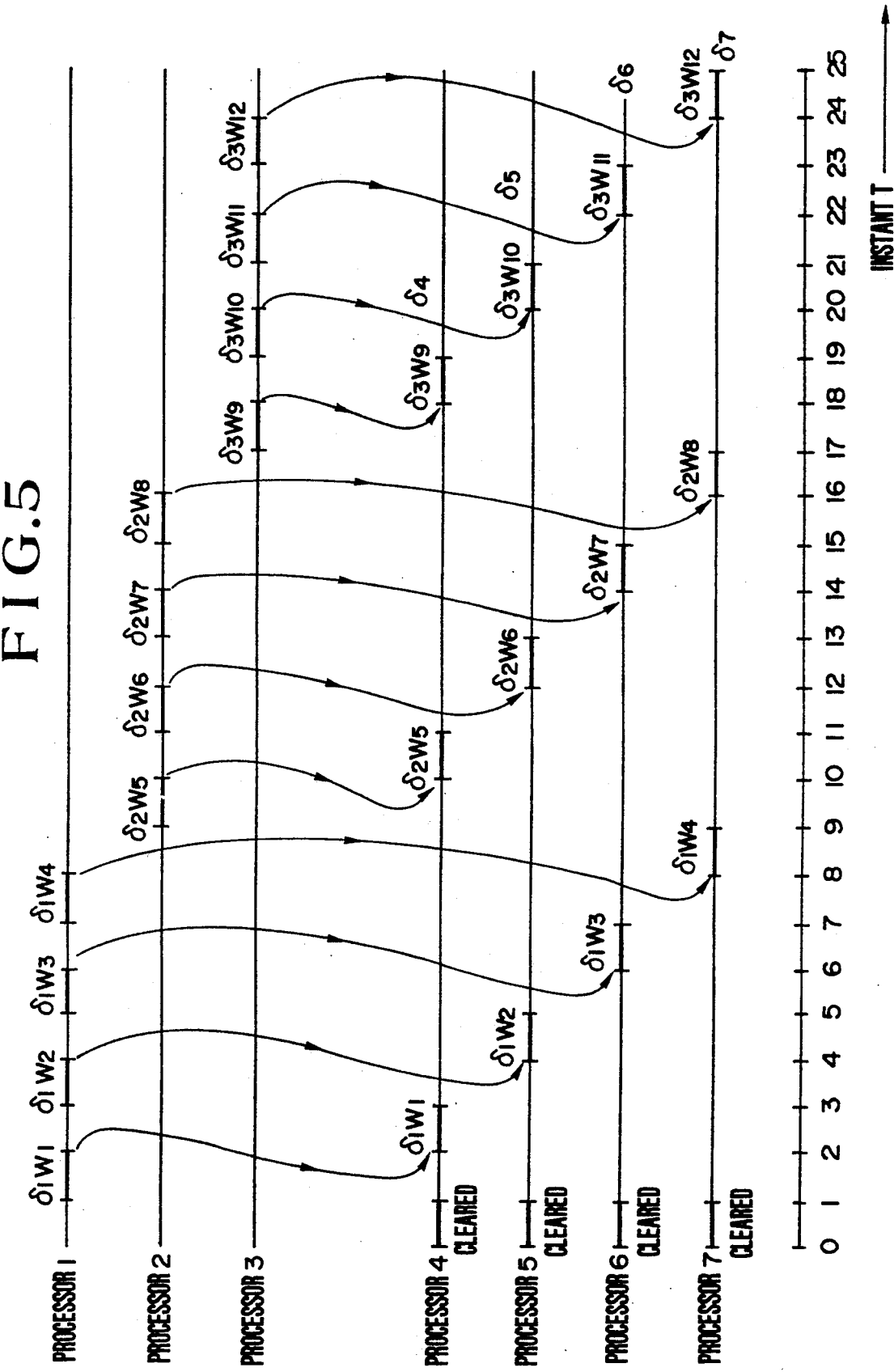
FIG. 5 is a diagram showing the flow of a processing upon backward calculation in a bus connection type network in which no mirror weight is provided.

FIG. 5 shows the case where no mirror weight is provided and the weights are localized in processors in the bus connection type network shown in FIG. 1. In this case, the above-mentioned operation at the interval 4 in FIG. 4 when the generalized differences at the hidden layer are determined, becomes a problem. As shown in FIG. 5, the processors in the hidden layer and the output layer must use the bus 11 to transfer δW in the backward direction by the number of connections. This results in that only one processor is operating. Accordingly, the improvement in performance based on the parallel processing cannot be expected.

In the foregoing, the effect of the parallel processing resulting from the introduction of mirror weights has been explained in conjunction with the case where the calculation in the network shown in FIG. 2 is implemented by the construction of FIG. 1A in which one processor is provided for one node. Generally, in many cases, the number of nodes required in a network may differ from the number of processors. If the number of processors is small, one processor will take change of calculation for a plurality of nodes. Inversely, if the number of processors is large, weights for a node will be divisionally shared by different processors. Further, in the case where a localized storage area of one processor is small as compared with storage areas necessary for the number of weights for a mode, it is required that the weights are divisionally distributed to a plurality of processors.

In the case of a construction in which a usual microprocessor is used to perform processing for one node, the scale of processing per one node is small and the capacity of storage area for weights of link for that node is small. For example, in the case where one node is linked or connected with 1,000 nodes, the storage area necessary for weights of link is 8K bytes, provided that four bytes are allotted to each of W and ΔW at the preceding time for one link or connection. This capacity is small as compared with the processing ability of the usual microprocessor. If the number of nodes constructing a network may become, for example, larger than 1,000, the allotment of nodes to processors is not optimum and some nodes must be allotted to one processor.

If one node is assigned to one processor, the number of the processors becomes equal to that of the nodes. Namely, the microprocessors more than 1000 become necessary. However, even if the number of the processors is reduced by assignment of plural nodes to one processor, the processings can be performed because the capacity is considered to be enough.

On the other hand, in the case where a single or a plurality of LSI chips such as a microprocessor, a memory LSI and a control circuit are all integrated in one chip, unlike the case where a processor is constructed by discrete components as mentioned above, the size of the chip itself gives an influence on the yield and hence it is difficult to make the size of the chip large, thereby restricting the overall performance and the storage capacity. This tendency becomes remarkable in the case where many chips are integrated on a wafer and the whole of the wafer is used as a system composed of a plurality of processors. Accordingly, there may be the case where one node must be shared by different processors because of the restriction to the capacity.

Figure 6:
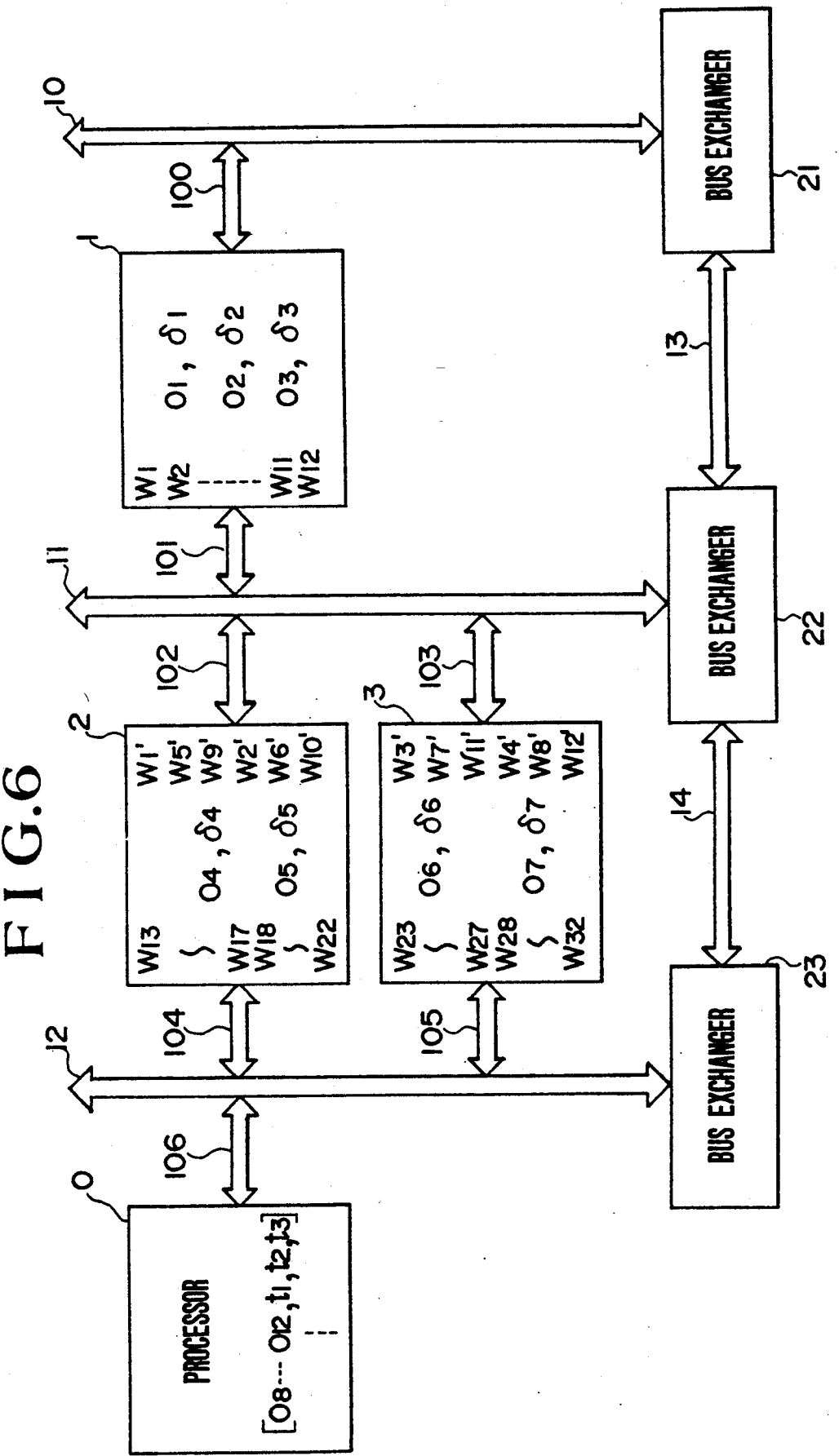
FIG. 6 is a block diagram showing a modification of the construction of FIG. 1A in which one processor takes charge of a plurality of nodes.
Figure 7:
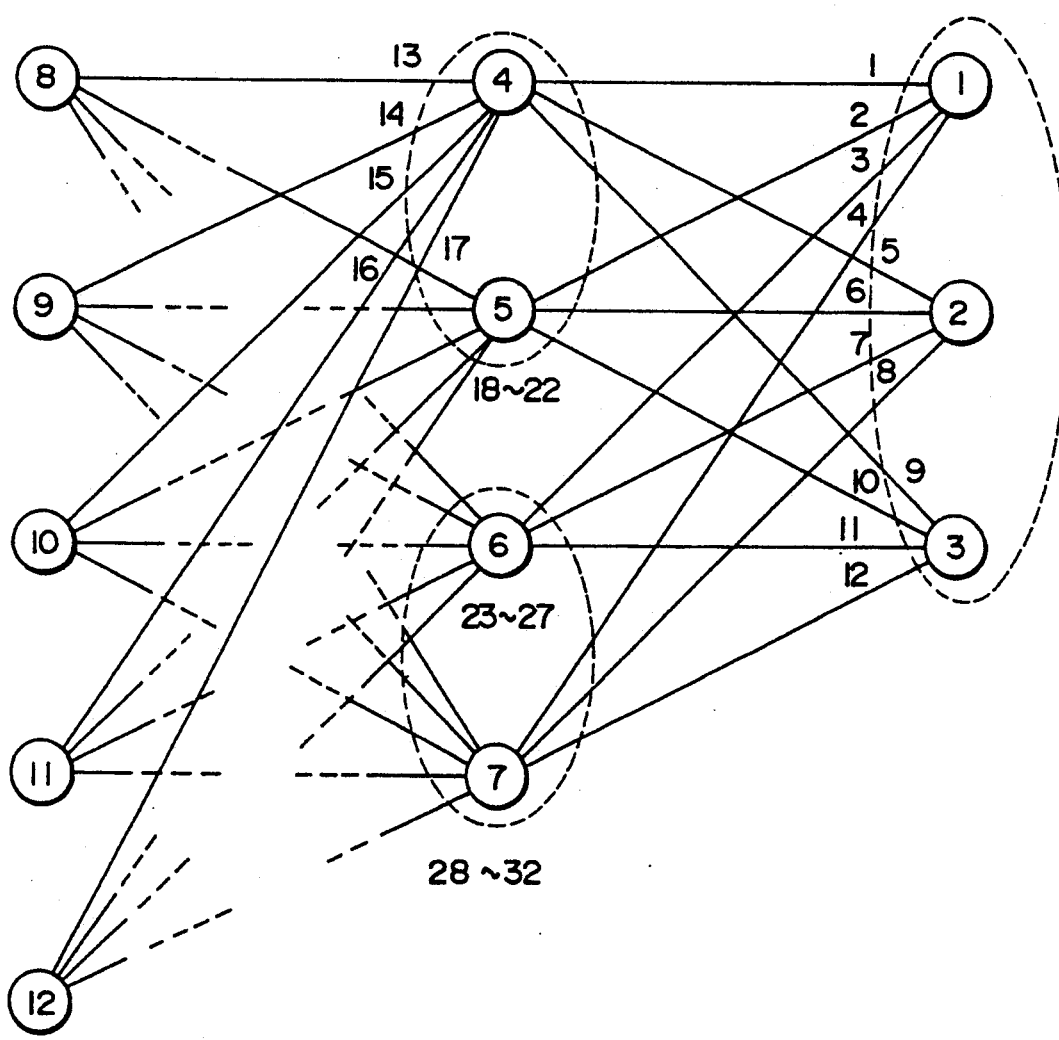
FIG. 7 is a diagram showing a correspondence between the construction shown in FIG. 6 and a multi-layer

Next, explanation will be made of the case of such a network in which the construction of one processor per one node is not employed. FIG. 6 shows the case where one processor takes charge of a plurality of nodes. The allottment of processors in this case is shown in FIG. 7. Nodes enclosed by dotted line in FIG. 7 are processed in the same processors. A processor 1 taken charge of the nodes of the output layer shown in FIG. 2 and processors 2 and 3 take charge of the nodes of the hidden layer. In this case, the construction including a bus construction is the same as the construction of FIG. 1 except the number of processors. Storage locations of outputs, differences and mirror weights are as shown in FIG. 6. In a forward processing, the parallel processing performed by the processors 1 to 3 in FIG. 3 is replaced by a serial processing in the processor 1 in FIG. 6. In a backward calculation, too, the correction of mirror weights and the calculation of sum of products for differences are similarly performed by serial processings.

Figure 8:
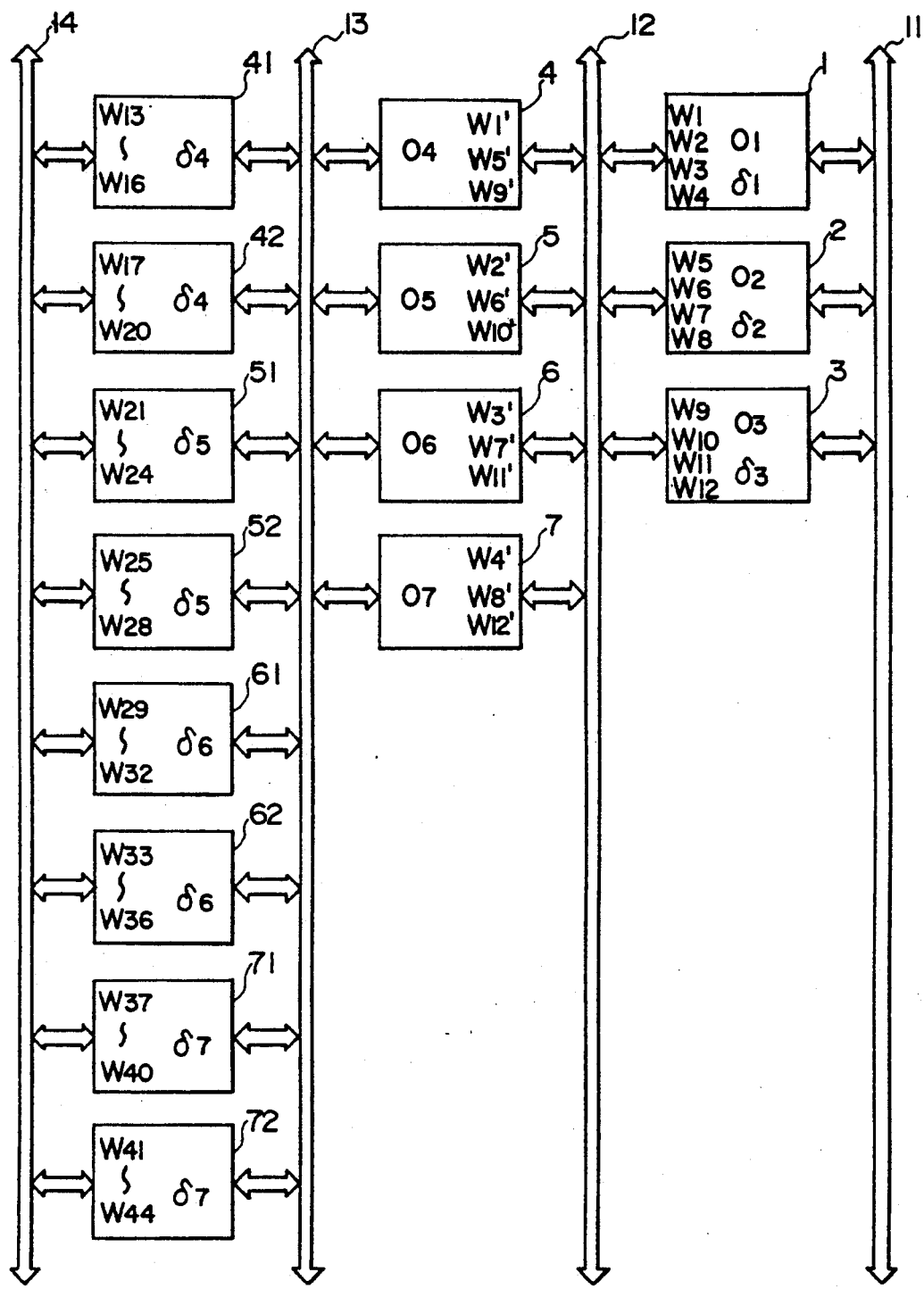
FIG. 8 is a block diagram showing another modification of the construction of FIG. 1A in which one node is shared by a plurality of processors.
Figure 9:
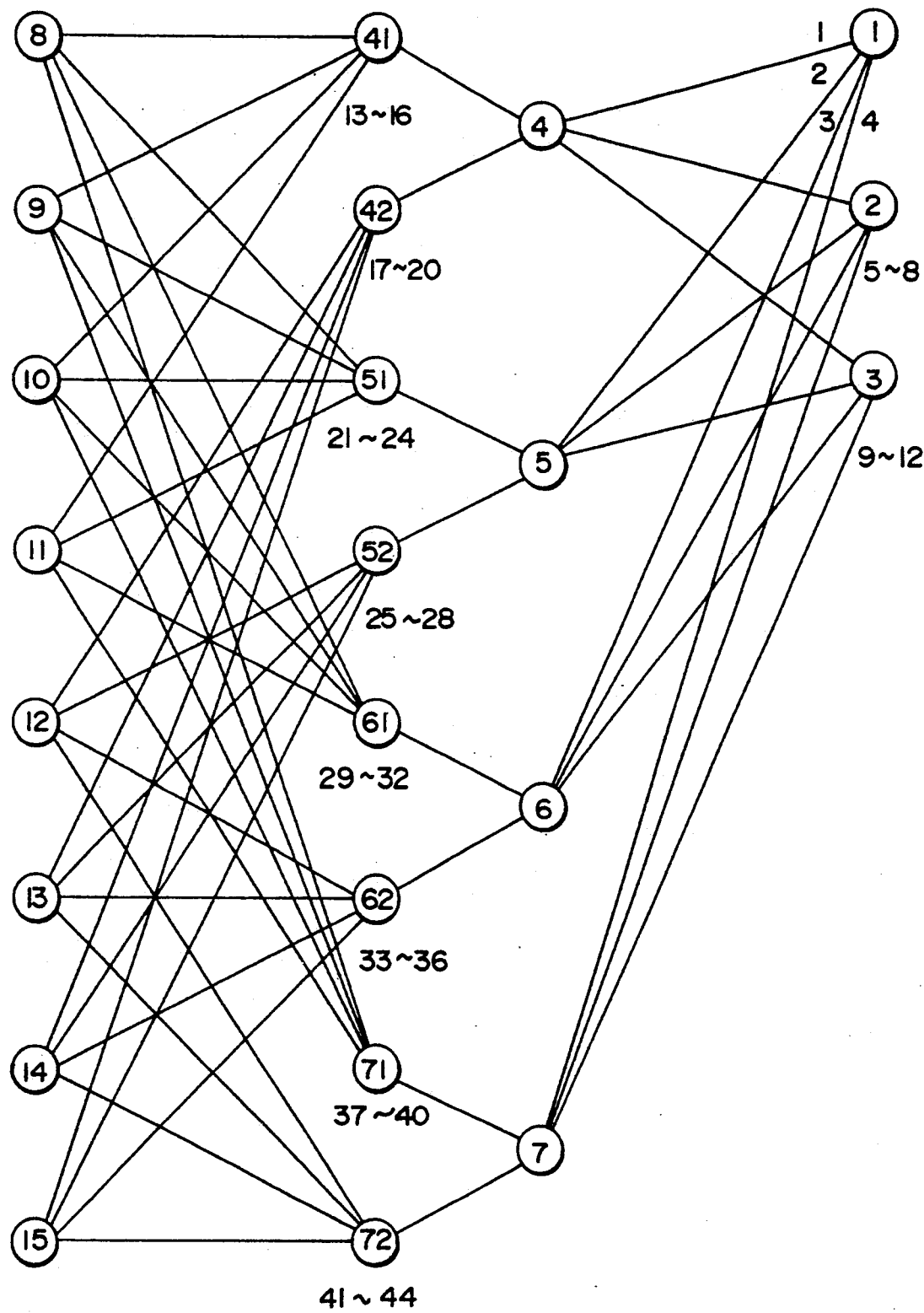
FIG. 9 is a diagram showing a correspondence between the construction shown in FIG. 8 and a multi-layer

FIG. 8 shows a construction in which the weights of link for one node of the hidden layer are shared by a plurality of processors in the case where the capacity for the weights exceeds the maximum storage capacity of one processor. The case where the capacity for the weights of link exceeds the maximum storage capacity may include the case where a node of the hidden layer is linked with many nodes of the input layer, the case where mirror weights are stored in nodes of the hidden layer, or the case where working storage areas for ΔW, etc. are ensured. The configuration of the network and the allottment of processors are shown in FIG. 9. In FIG. 9, three processors 41, 42 and 4 share the node 4 of FIG. 2. The connection with the input layer is made by the processors 41 and 42. Output values from the two processors 41 and 42 ar supplied to the processor 4 to produce a final sum, thereby completing the calculation of sum of products between the input layer and the hidden layer. At the same time, a sigmoid function or the like is applied so that $o_4$ which is an output value of the node 4 is calculated by the processor 4. The storage locations of outputs o, differences δ, weights W and mirror weights W' in this case are shown in FIG. 8. The values stored at the node 4 are such that the processor 41 stores weights $W_{13}$ to $W_{16}$ of link, a difference 64, the intermediate result of sum of products, and so on, the processor 42 stores weights $W_{17}$ to $W_{20}$ of link, the difference $δ_4$ and the intermediate result of sum of products, and so on and the processor 4 stores the output value $o_4$ from the node 4 and mirror weights $W_1'$, $W_5'$ and $W_9$.

Figure 10:
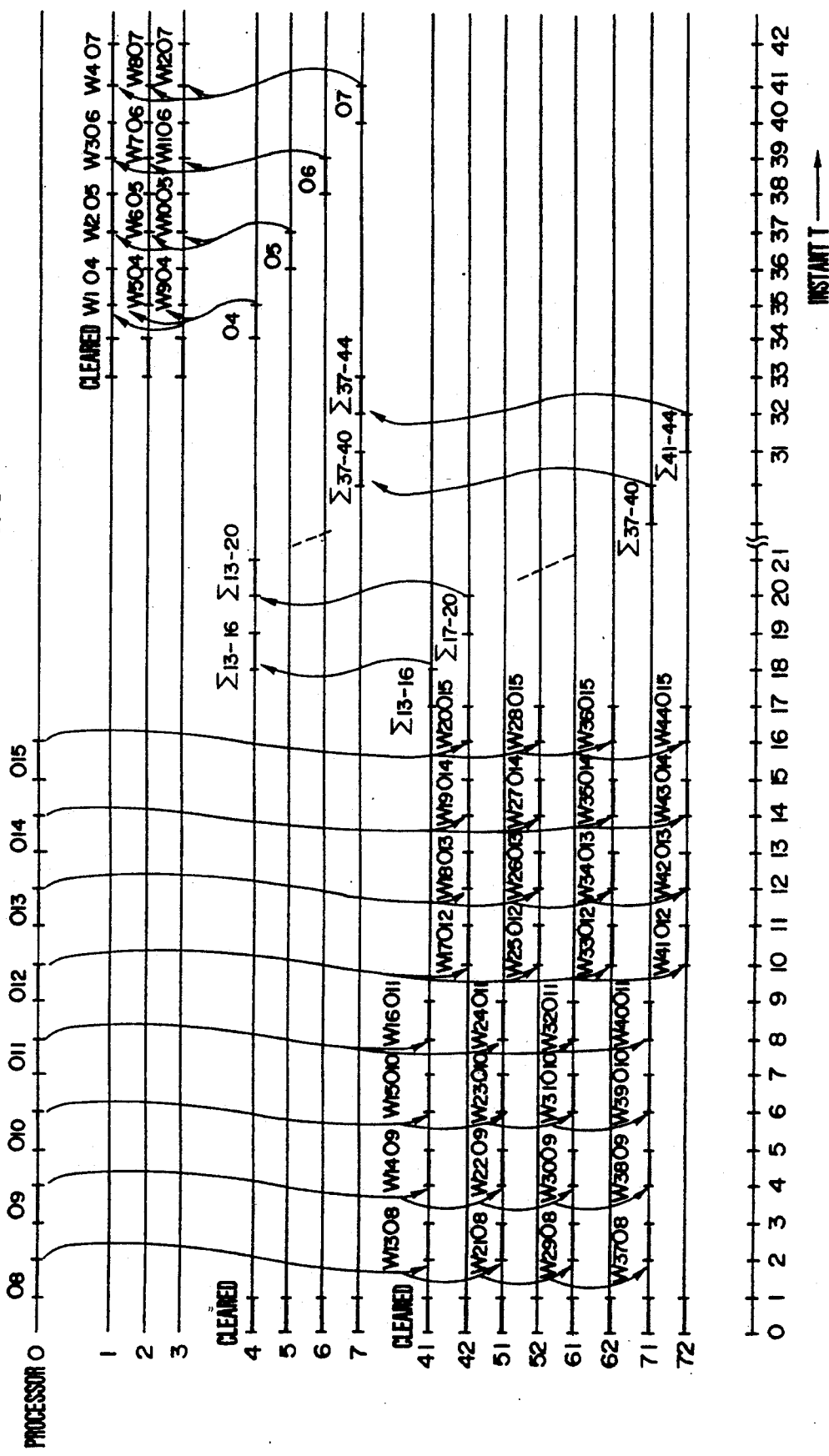
FIG. 10 is a diagram showing the flow of a processing upon forward calculation in the case of the construction shown in FIG. 8.

FIG. 10 shows the operation of each processor upon forward calculation in the case of the construction shown in FIG. 8. At instant 0 of time, all of processors sharing the nodes of the hidden layer are initialized. At instants 1 to 9, a partial sum of products corresponding to one divisional half of the weights of link is performed. At instants 9 to 17, a partial sum of products corresponding to the other divisional half is performed. The processor or 41 places the value $Σ_{13-16}$ of the partial sum of products on a bus 13 at instant 17 and the processor 4 receives the value $\Sigma_{13-16}$ at instant 18. The processor 42 places the value $\Sigma_{17-20}$ of the sum of products on the bus at instant 19. At instant 20, the processor 4 receives the value $\Sigma_{17-20}$ and calculates the sum $\Sigma_{13-20}$ of the value $\Sigma_{17-20}$ and the value $\Sigma_{13-16}$ which was received at instant 18. The similar calculation of the sum of partial sums of products is continued until instant 33, thereby completing the calculation of sum of products from the input layer to the hidden layer. The subsequent operation from the hidden layer to the output layer is similar to the case of FIG. 3. In the construction shown in FIG. 8, since the bus 13 is connected with twelve processors, an interval from instant 17 to instant 33 are necessary for determining the sums from the partial sums of products. If buses are divisionally provided for respective nodes so that they are capable of operating independently from each other, the determination of the sums is completed in an interval from instant 17 to instant 21.

Figure 11A:
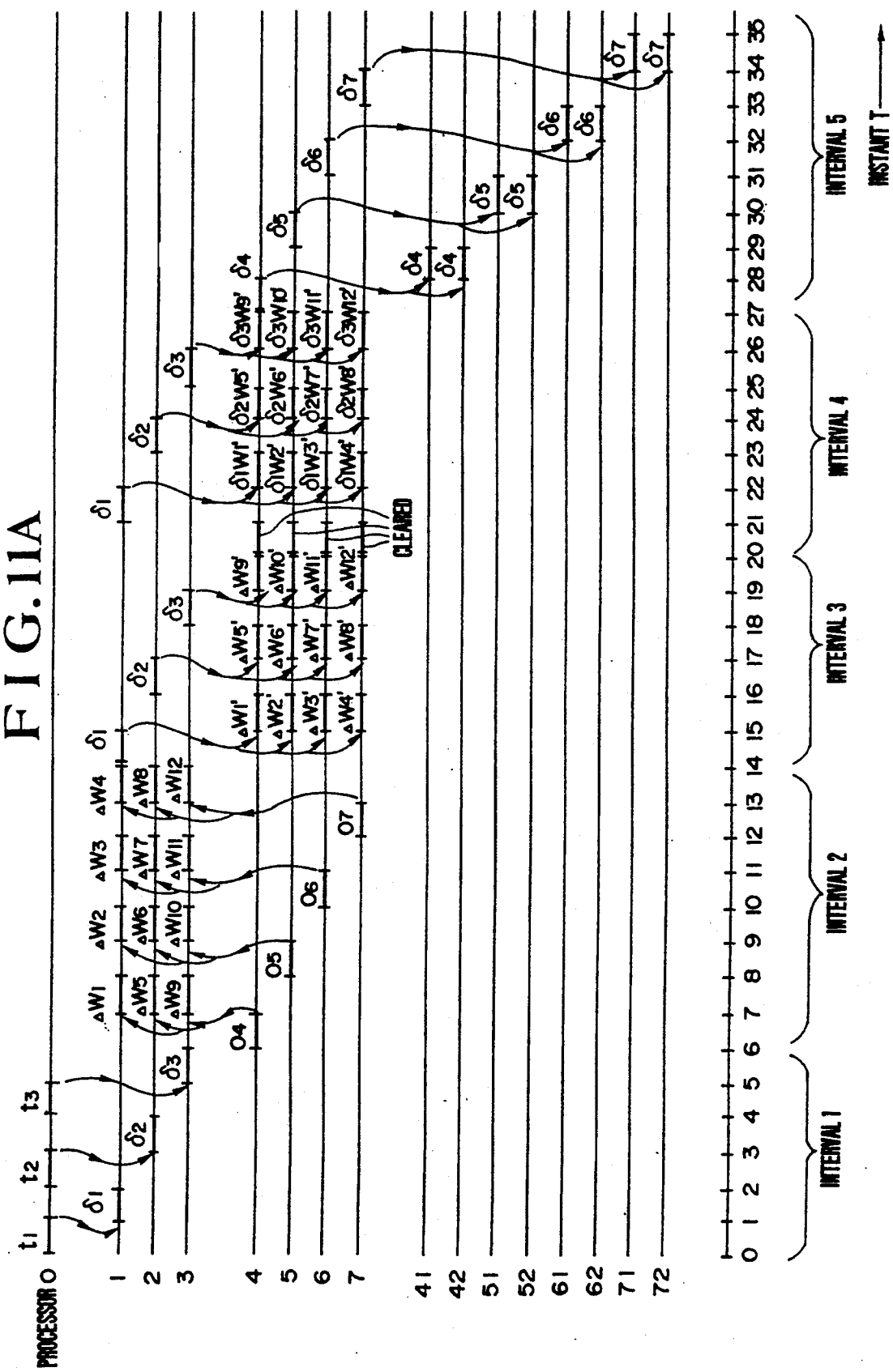
FIGS. 11A and 11B are a diagram showing as a whole the flow of a processing upon backward calculation in the case of the construction shown in FIG. 8.
Figure 11B:
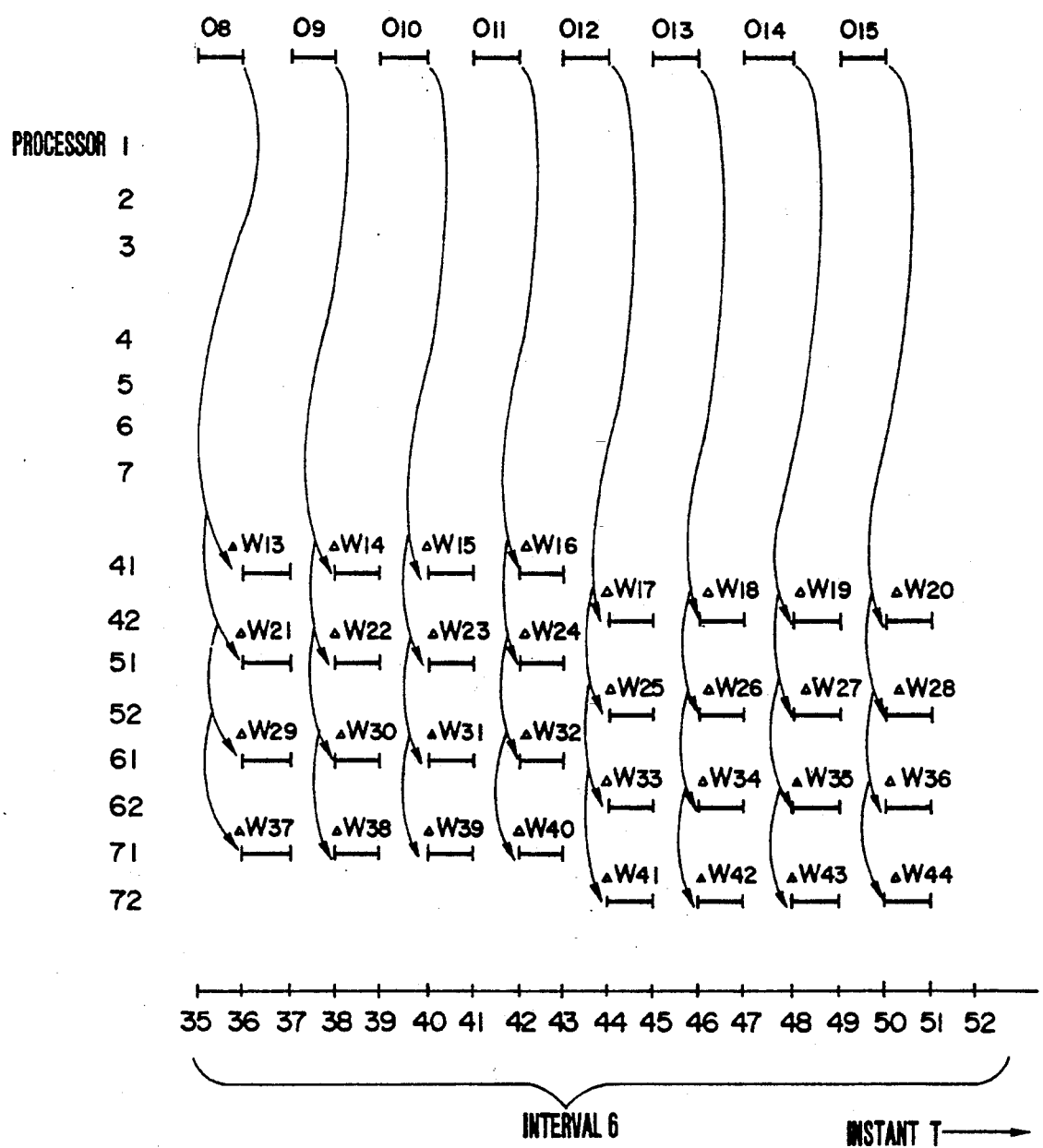

FIGS. 11A and 11B show as a whole the operation of each processor upon backward calculation in the case of the construction shown in FIG. 8. Intervals 1 to 5 are shown in FIG. 11A and an interval 6 is shown in FIG. 11B. The operation until the interval 4 terminated at interval 27 is the same as the case of FIG. 4. The operation in the intervals 5 and 6 is different from the case of FIG. 4. Namely, in the interval 5 from instant 27 to instant 35 in FIG. 11A, differences determined by processors 4 to 7 are transferred to processors 41 and 42 to 71 and 72. The transfer time can be shortened if independent buses are provided, as mentioned before. One divisional half of weights of link is corrected in a portion of the interval 6 from instant 35 to instant 43 in FIG. 11B and the other divisional half of weights of link is corrected in the remaining portion of the interval 6 from instant 43 to instant 51.

Figure 12:
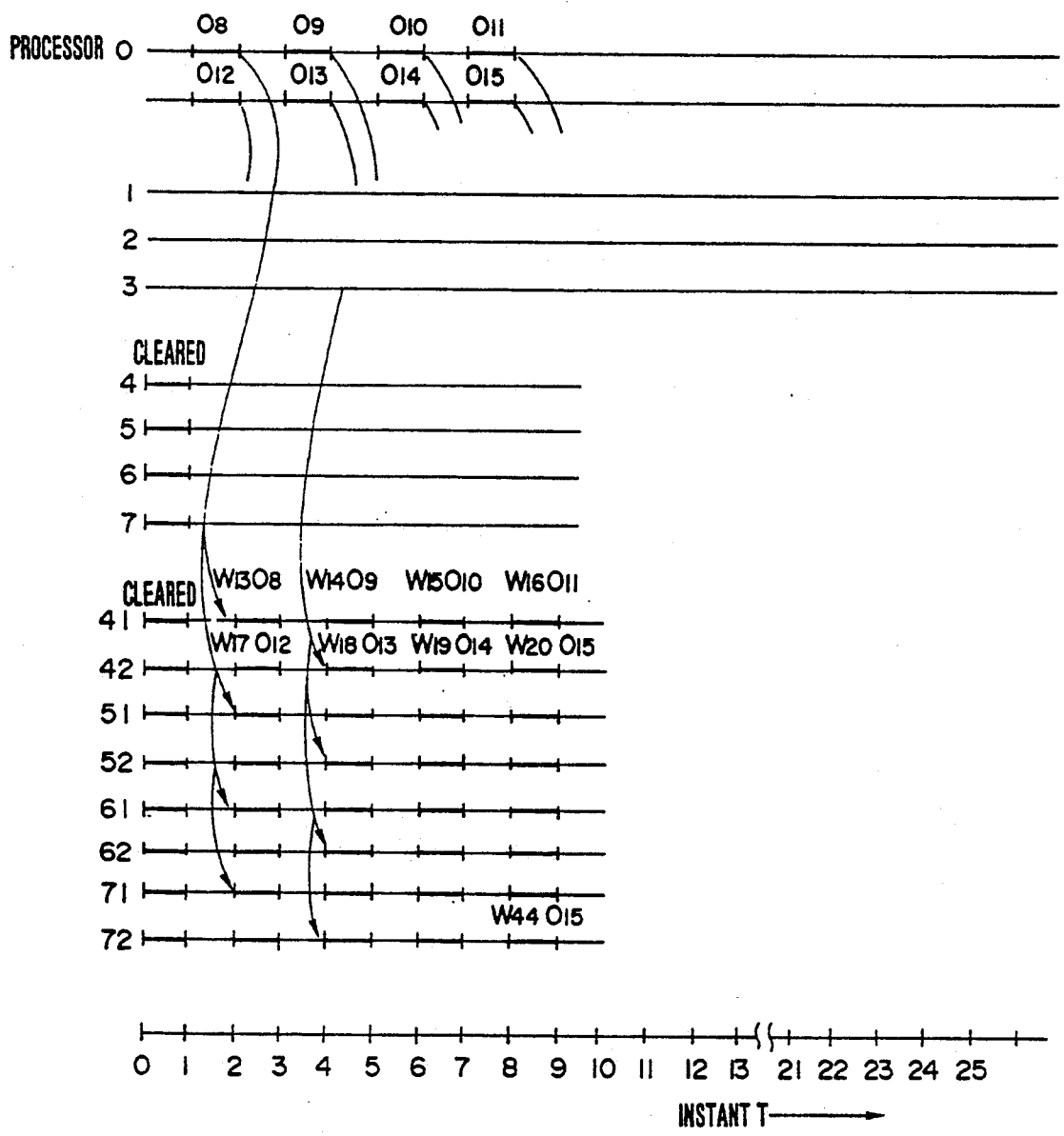
FIG. 12 is a diagram showing an example in which the improvement in speed is attained by using separated buses.

When the bus 13 is used for the calculation of partial sum of products and the transfer of difference δ, processors do not operate simultaneosuly. This is because notwithstanding that the division of a processor enables parallel operation, the divisional processors are placed in idle conditions since the bus is commonly used. Accordingly, this problem can be solved if there are independently operable buses, as mentioned before. For example, if the bus 14 is divided into two ways and the processor 0 is replaced by two processors 00 and 01, it is possible to reduce the idle conditions of processors upon forward calculation, as shown in FIG. 12.

According to the present invention, since a plurality of processors can operate simultaneously, there is provided an effect that a speed proportional to the number of processors is obtained.

What is claimed is:

1. A multi-layer network comprising:
an input layer including input means for inputting a plurality of data;
a hidden layer connected to the input means of said input layer and including a plurality of data processors, each of which having means for storing factors of multiplication from input layer to hidden layer corresponding to connections with the input means of said input layer and having means for calculating based on said factors of multiplication from input layer to hidden layer a sum of products on a plurality of data delivered from the input means of said input layer; and
an output layer connected to the plurality of data processors of said hidden layer and including a plurality of data processors, each of which having means for storing factors of multiplication from hidden layer to output layer corresponding to connections with the plurality of data processors of said hidden layer and having means for calculating based on said forces of multiplication a sum of products on a plurality of data delivered from the plurality of data processors of said hidden layer,
said each data processor of said hidden layer further having means for storing factors of multiplication from output layer to hidden layer corresponding to connections with the plurality of data processors of said output layer, and said calculating means performing calculation of a sum of products based on said factors of multiplication from output layer to hidden layer on a plurality of data delivered from the plurality of data processors of said output layer.

2. A multi-layer network according to claim 1, wherein each one of the plurality of data processors of at least one of said hidden layer and said output layer is provided in correspondence to one of said nodes, said nodes being units which constitute the multi-layer network.

3. A multi-layer network according to claim 1, wherein each one of the plurality of data processors of at least one of said hidden layer and said output layer is provided in correspondence to a set of plural ones of said nodes, said nodes being units which constitute the multi-layer network.

4. A multi-layer network according to claim 1, wherein a data processing means belonging to said hidden layer across a content of said storing means with the contents being divided among a plurality of data processing means.

5. A multi-layer network according to claim 1, wherein said storing means stores a part of the factors of multiplication stored in the storing means which are respectively included in each one of the plurality of data processors belonging to successive layers.

6. A multi-layer network according to claim 1, wherein
said hidden layer comprises at least two layers including a first hidden layer located closer to said input layer and a second hidden layer located closer to said output layer,
said first hidden layer includes a plurality of data processors, and said second hidden layer includes a plurality of data processors,
each of the data processors of said first hidden layer has means for storing factors of multiplication from input layer to first hidden layer corresponding to connections with the input means of said input layer, means for storing factors of multiplication from second hidden layer to first hidden layer corresponding to connections with the plurality of data processors of said second hidden layer, and means for calculating a sum of products on a plurality of data delivered from the input means of said input layer based on said factors of multiplication from input layer to first hidden layer, or on a plurality of data delivered from the plurality of data processors of said second hidden layer based on said factors of multiplication from second hidden layer to first hidden layer, and
each of the data processors of said second hidden layer has means for storing factors of multiplication from first hidden layer to second hidden layer corresponding to connections with the plurality of data processors of said first hidden layer, means for storing factors of multiplication from output layer to second hidden layer corresponding to connections with the plurality of data processors of said output layer, and means for calculating a sum of products on a plurality of data delivered from said plurality of data processors of said first hidden layer based on said factors of multiplication from first hidden layer to second hidden layer, or on a plurality of data delivered from said plurality of data processor of said output layer based on said factors of multiplication from output layer to second hidden layer.

7. A multi-layer network according to claim 1, wherein said hidden layer comprises at least three layers including a first hidden layer located closer to said input layer, a second hidden layer located closer to said output layer, and a third hidden layer other than said first and second hidden layers, said first hidden layer includes a plurality of data processors, said second hidden layer includes a plurality of data processors, and said third hidden layer includes a plurality of data processors, each of the data processors of said first hidden layer has means for storing factors of multiplication from input layer to first hidden layer corresponding to connections with the input means of said input layer, means for storing factors of multiplication from third hidden layer to first hidden layer corresponding to connections with the plurality of data processors of said third hidden layer, and means for calculating a sum of products on a plurality of data delivered from the input means of said input layer based on said factors of multiplication from input layer to first hidden layer, or on a plurality of data delivered from the plurality of data processors of said third hidden layer based on said factors of multiplication from third hidden layer to first hidden layer, each of the data processors of said second hidden layer has means for storing factors of multiplication from third hidden layer to second hidden layer corresponding to connections with the plurality of data processors of said third hidden layer, means for storing factors of multiplication from output layer to second hidden layer corresponding to connections with the plurality of data processors of said output layer, and means for calculating a sum of products on a plurality of data delivered from the plurality of data processors of said third hidden layer based on said factors of multiplication from third hidden layer to second hidden layer, or on a plurality of data delivered from the plurality of data processors of said output layer based on said factors of multiplication from output layer to second hidden layer, and each of the data processors of said third hidden layer has means for storing factors of multiplication from first hidden layer to third hidden layer corresponding to connections with the plurality of data processors of said first hidden layer, means for storing factors of multiplication from second hidden layer to third hidden layer corresponding to connections with the plurality of data processors of said second hidden layer, and means for calculating a sum of products on the plurality of data delivered from the plurality of data processors of said first hidden layer based on said factors of multiplication from first hidden layer to third hidden layer, or on a plurality of data delivered from the plurality of data processors of said second hidden layer based on said factors of multiplication from second hidden layer to third hidden layer.

8. A multi-layer network according to claim 1, wherein each of the data processors of said hidden layer includes means for storing factors of multiplication corresponding to connections of another of the data processors with the input means of said input layer, and means for storing factors of multiplication corresponding to connections of said another of the data processors with the plurality of data processors of said output layer.

9. A multi-layer network according to claim 1, further comprising connecting means for connecting among said input layer, said hidden layer, and said output layer, and exchanging means for changing over connections by said connecting means.

10. A multi-layer network according to claim 9, wherein said connecting means includes a plurality of buses.

11. A learning method performed by using a multi-layer network, said multi-layer network comprising:

an input layer including an input means for inputting a plurality of data;

a hidden layer connected to the input means o said input layer and including a plurality of data processors, each of which having means for storing factors of multiplication from input layer to hidden layer corresponding to connections with the input means of the input layer, means for storing factors of multiplication from output layer to hidden layer corresponding to connections with data processors of an output layer, and means for calculating a sum of products on a plurality of data delivered from the input means of said input layer based on said factors of multiplication from input layer to hidden layer, or on a plurality of data delivered from the data processors of said output layer based on said factors of multiplication from output layer to hidden layer; and said output layer connected to the plurality of data processors of said hidden layer and including the plurality of data processors, each of which having means for storing factors of multiplication from hidden layer to output layer corresponding to connections with the plurality of data processors of said hidden layer, and means for calculating based on said factors of multiplication from hidden layer to output layer a sum of products on a plurality of data delivered from the plurality of data processors of said hidden layer;

said learning method comprising the steps of:

setting an initial value of each of said factors of multiplication from input layer to hidden layer and said factors of multiplication from output layer to hidden layer in said plurality of data processors in said hidden layer, and said factors of multiplication from hidden layer to output layer in said plurality of data processors in said output layer, inputting a plurality of data to the input means of said input layer and calculating a sum of products in each of the plurality of data processors of said hidden layer and in each of the plurality of data processor of said output layer, adjusting said factors of multiplication from hidden layer to output layer, said factors of multiplication from output layer to hidden layer, and said factors of multiplication from input layer to hidden layer on the basis of differences between a plurality of data obtained from the plurality of data processors of said output layer as a result of said calculation of the sum of products and supervised data representing desired output data, repeating the adjustment of said factors of multiplication from hidden layer to output layer, said factors of multiplication from output layer to hidden layer, and said factors of multiplication from input layer to hidden layer until the plurality of data obtained from the plurality of data processors of said output layer are approximately equal to the supervised data, adjusting the factors of multiplication from output layer to hidden layer in the plurality of data processors of said hidden layer and said factors of multiplication from hidden layer to output layer in the plurality of data processors of said output layer, so that the first mentioned factors of multiplication and the second mentioned factors of multiplication assume identical values.

12. A multi-layer network comprising:

an input layer including input means for inputting a plurality of data;

a first hidden layer connected to the input means of said input layer and including a plurality of data processors, each of which having means for storing factors of multiplication from input layer to first hidden layer corresponding to connections with the input means of said input layer, and means for calculating based on said factors of multiplication from input layer to first hidden layer a sum of products on a plurality of data delivered from the input means of said input layer;

a second hidden layer connected to the plurality of data processors of said first hidden layer, or to a plurality of data processors of a hidden layer other than said first hidden layer, said second hidden layer including a plurality of data processors, each of which having means for storing factors of multiplication from first hidden layer to second hidden layer corresponding to connections with the plurality of data processors of said first hidden layer, or with the plurality of data processors of the hidden layer other than said first hidden layer, and means for calculating a sum of products on a plurality of data delivered from the plurality of processors of said first hidden layer based on said factors of multiplication from first hidden layer to second hidden layer, or on a plurality of data delivered from the plurality of data processors of said another hidden layer based on said factors of multiplication form another hidden layer to second hidden layer; and an output layer connected to the plurality of data processors of said second hidden layer and including a plurality of data processors, each of which having means for storing factors of multiplication from second hidden layer to output layer corresponding to connections with the plurality of data processors of said second hidden layer, and means for calculating based on said factors of multiplication from second hidden layer to output layer a sum of products on a plurality of data delivered from the plurality of data processors of said second hidden layer, wherein said each of the plurality of data processors of said first hidden layer further comprises means for storing factors of multiplication from second hidden layer to first hidden layer corresponding to connections with the plurality of data processors of said second hidden layer, or storing factors of multiplication from another hidden layer to first hidden layer corresponding to connections with the plurality of data processors of said another hidden layer, and said calculating means performs calculation of a sum of products on a plurality of data delivered from the plurality of data processors of said second hidden layer based on said factors of multiplication from second hidden layer to first hidden layer, or from the plurality of data processors of said another hidden layer based on said factors of multiplication from another hidden layer to first hidden layer, and said each of the plurality of data processors of said second hidden layer further comprises means for storing factors of multiplication from output layer to second hidden layer corresponding to connections with the plurality of data processors of said output layer, and said calculating means performs calculation, based on said stored factors of multiplication from output layer to second hidden layer, of a sum of products on a plurality of data delivered from the plurality of data processors of said output layer.

* * * * *

UNITED STATES PATENT AND TRADEMARK OFFICE
CERTIFICATE OF CORRECTION

PATENT NO. : 5,212,767
DATED : May 18, 1993
INVENTOR(S) : Junichi Higashino, et al.

It is certified that error appears in the above-identified patent and that said Letters Patent is hereby corrected as shown below:

Claim 1, column 14, line 6, delete "forces" and substitute therefor --factors--.

Claim 6, column 15, line 11, delete "processor" and substitute therefor --processors--.

Claim 11, column 16, line 29, delete "o" and substitute therefor --of--.

Claim 11, column 17, line 2, delete "processor" and substitute therefor --processors--.

Claim 12, column 18, line 8, delete "form" and substitute therefor --from--.

Signed and Sealed this

Twenty-eighth Day of December, 1993

*Attest:*

BRUCE LEHMAN

*Attesting Officer*  *Commissioner of Patents and Trademarks*